Feb. 19, 1963 W. CARROLL 3,077,715
AUTOMOTIVE AIR INTAKE APPARATUS
Filed Oct. 25, 1960
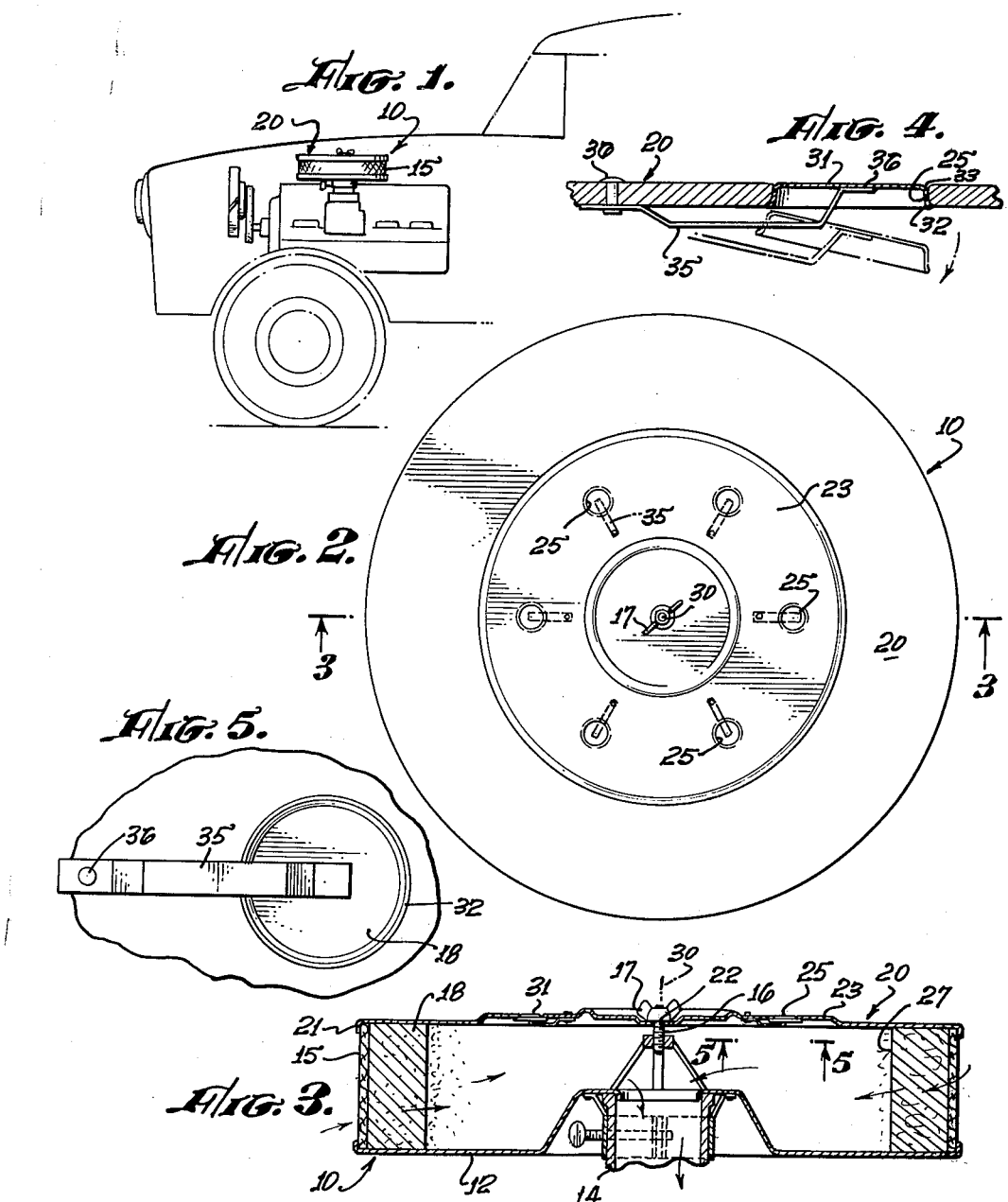
INVENTOR.
WILLIAM CARROLL,
BY HIS ATTORNEYS.
Spensley & Horn 3,077,715
AUTOMOTIVE AIR INTAKE APPARATUS
William Carroll, 11060 Fruitland Drive,
North Hollywood, Calif.
Filed Oct. 25, 1960, Ser. No. 64,904
3 Claims. (Cl. 55—310)

This invention relates to air filters and carburetors and more particularly to intake air filters on the intake side of the fuel mixture source for internal combustion engines.

Internal combustion engines are usually equipped with an air filter, the filter canister being mounted to cover the engine air intake passage. The filter canister contains a quantity of filter material by which or through which the air is passed before it is introduced into the engine. The filter material contains many thousands of tiny air passages through which air may readily pass but through which grit, dust and other particles will not pass. To avoid the undue restriction of air flow the total cross-sectional area of the tiny filter passages should be somewhere on the order of the cross-sectional area of the air intake passage. Hence, a relatively large area of filter material must be exposed to the air stream to provide the necessary air passage area. As used on vehicle engines, the shape of the filter canister is dictated by available underhood space and esthetic considerations, and so the air travels a relatively circuitous path, both through the filter material and from the filter material to the air intake. At low and intermediate engine speeds, a sufficient volume of air can be introduced into the intake passage to meet engine demands. However, at high engine speeds, breathing is restricted because a sufficient volume of air cannot pass through the filter quickly enough to meet engine demands. This restriction of engine breathing at high engine speed limits the maximum power output of the engine.

Accordingly, it is an object of the present invention to provide a means adapted to increase the air available to the engine at high engine speeds.

It is another object of the present invention to provide an apparatus which can be removably attached to an air filter canister or be a portion of an air filter canister to allow bypass of air past the filter element to the engine.

A further object of the present invention is to provide such an air bypass apparatus which functions automatically when a large volume of air is to pass to the engine.

It is still a further object of the present invention to provide a novel air filter bypass apparatus which is easy to install in or on air filter canisters and is simple and economical to manufacture.

The present invention comprises an air filter bypass apparatus which includes a member mateable with an air filter canister to form a portion of the canister. An opening is provided through the apparatus in direct communication with the air outlet from the air filter assembly to the air intake of the carburetor. A valve is positioned at each of the openings and is normally urged to a closed position to prevent air entry through the respective opening. Means are provided for opening the valve when large quantities of air are needed for the engine.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

In the drawing:

FIGURE 1 is a partially schematic view showing a typical air intake filter canister of the type to which the present invention is particularly adapted;

FIGURE 2 is a plan view of the presently preferred embodiment of the present invention;

FIGURE 3 is a cross-sectional view in elevation taken along line 3—3 of FIGURE 2;

FIGURE 4 is an enlarged partial view of a valve and part of the presently preferred embodiment showing the valve in the closed position, and in phantom in the open position; and FIGURE 5 is a partial plan view corresponding to FIGURE 4 taken along line 5—5 of FIGURE 3.

Referring now to the drawing:

There is shown throughout the several views, a presently preferred embodiment of the present invention as adapted to be mounted upon a canister 10 which contains an air filter of the annular type. That is, the canister 10 is a hollow metal body which is generally cylindrical in shape with a lower surface member 12 adapted to be fitted upon the air intake conduit 14 of a carburetor as shown particularly in FIGURE 3. The side wall 15 of the canister is cylindrical and means are provided for affixing a top plate to enclose the canister. In the usual arrangement a mounting screw 16 is affixed to the bottom surface 12 of the canister and lies approximately along the axis of the canister to extend above the top plate. The top plate is then affixed to the filter assembly by means of a wing nut 17. In the most usual configuration of the canister the side wall 15 is a filter screen or similar material which allows the relatively free passage of air. The annular air filter 18 has an outside diameter substantially equal to the inside diameter of the side wall 15. The material may be one of many suitable materials such as paper, which is formed in a tortuous configuration, fibrous filter material, and the like, which allow the passage of air but restrict the passage of particles and foreign materials. As is well known, the top plate member which is generally installed upon such a canister serves merely to close the canister and air passing into the carburetor must pass through the side wall 15 through the filter element 18 to the interior of the canister and thence downward through the air intake 14 to the carburetor.

The presently preferred embodiment of the present invention includes a plate-like member adapted to replace a normal top plate of such a filter assembly. Thus, the apparatus of the present invention includes a generally plate-like member 20 which is adapted to be affixed to the canister as the top plate thereof. In the embodiment shown, a downwardly extending flange 21 is adapted to mate with the side walls 15 of the canister and an opening 22 is provided through the plate 20 substantially at the center point thereof such that the fastening screw 17 fits through the opening 22 when the plate 20 is in position upon the canister, all of which is shown in FIGURE 3. The plate member 20 can be planar or can take various plate-like configurations. That is, as shown in the figures, in the presently preferred embodiment a raised center section 23 is provided in the plate for purposes of decorativeness and structural strength and rigidity.

Referring now to FIGURES 2 though 5 there is provided through the plate 20 a plurality of openings 25. The openings 25 are positioned at a radius which is less than the radius 27 of the inside surface of the filter element 18. Thus, air passing through the openings 25 will pass to the carburetor intake without passing through the filter element 18. In the embodiment shown, six such openings are utilized and are spaced at circumferential intervals along a radius line approximately midway between the axis 30 through the filter apparatus and the inside diameter surface 27 of the filter element.

Valve means are provided for selectively opening and closing the openings or apertures 25. In the presently preferred embodiment the valve means are spring loaded cantilevered type valves which will open when a sufficient downward force is exerted upon the valve member 30. Thus, in the embodiment shown, the plate 20 is formed of metallic sheet material and each of the valve elements 30 is formed of a substantially thinner metallic sheet material formed to a generally disc-like configuration. The valve member 30 accordingly includes a valve surface 31 and a depending circumferential flange 32 which is adapted to mate with the interior wall 33 of the aperture 25. Thus, in the closed position the valve member 30 extends into the opening 25 and substantially closes the opening against the passage of air therethrough. The valve member is affixed to a valve arm 35 which extends from the center of the valve member 30 to which it is affixed radially inward toward the center point of the plate 20. The valve arm 35 is non-planar and is affixed at its first end 36 to the valve member 30 and at its opposite end to the lower surface of the plate 20 by fastening means such as the rivet 36 shown particularly in FIGURES 4 and 5. The valve arm 35 is a spring member which normally urges the valve member 30 to the upper or closed position as shown in FIGURE 4. Under sufficient downward pressure on the valve member 30, the valve will move downward as shown in phantom in FIGURE 4 against the spring action of the valve arm 35. Accordingly, when sufficient force is exerted upon the valve members 30 in the downward direction the valves will open and allow the passage of air through the apertures 25 and directly to the carburetor intake such that the air passing to the carburetor need not pass through the filter element 18. Thus, in use, when the automobile engine is operated at high speeds or is rapidly accelerated to create a high vacuum at the carburetor intake, vacuum force will pull the valve members downward against the spring action of the arms 35 to open the apertures 25 and allow the relatively free passage of air therethrough. Thus, in an accelerating or high speed condition of the engine, air enters the carburetor both through the filter elements and through the bypass apertures 25 in order that large quantities of air may be supplied to the engine. It can be seen from the foregoing that the valve arms can be manufactured and designed by one skilled in the art to open at a predetermined force, which force is a function of the pressure exerted upon the valve members by the air intake requirements of the carburetor. It can also be seen that various other types of valve arrangements can be utilized within the spirit and scope of the present invention. The valves may be other than cantilevered valves and can be for example, valves which ride upon a vertically oriented stem and operate against a compression spring of the type well known to the art. Many suitable types of valve arrangements will be immediately apparent to one skilled in the art, it being required only that the valves open at a predetermined pressure on the valve. Similarly it can also be seen from the foregoing that the valves can be controlled by mechanical, electrical or vacuum linkages and can be adapted to manual operation such that the valves can be opened and closed selectively by the operator of the vehicle. Although a cylindrical annular filter member has been described in connection with the presently preferred embodiment, the present invention can also be adapted to other filter and canister configurations and can be built into the filter canisters or similar air filtering devices as an original part thereof.

Thus, the present invention provides an apparatus which can be readily mounted upon an installed air filter canister to provide a simple and economical means for bypassing the air filter element of the air intake apparatus to supply greater quantities of air to the internal combustion engine when necessary for more efficient operation of the engine.

What is claimed is:

1. In an internal combustion engine air filter assembly wherein a filter support member is mountable to the engine air intake and supports a cylindrical annular filter element which is detachably secured thereto by a removable filter cover, the substantial entirety of one end surface of said cylindrical annular filter element being in contact with the inner surface of said filter cover and the substantial entirety of the other end surface of said filter element being in contact with said filter support member whereby all air drawn into the engine air intake normally passes through said filter element, the improvement comprising a plurality of spring-loaded cantilever type valves mounted to the interior surface of said filter cover and surrounded by the annulus of said filter element, each of said valves consisting of a valve member mounted to the free end of a cantilever spring valve arm of predetermined resiliency, each of said valve members being normally held by the resiliency of its associated cantilever spring valve arm in sealing relationship with an aperture through said filter cover, whereby when the vacuum force in said engine air intake proximate said filter assembly overcomes the resilient spring force of said valve arms said valve members will be withdrawn from said apertures and unfiltered air drawn through said apertures into said air intake.

2. In an internal combustion engine air filter assembly wherein a filter support member is mountable to the engine air intake and supports a cylindrical annular filter element which is detachably secured thereto by a removable filter cover, the substantial entirety of one end surface of said cylindrical annular filter element being in contact with the inner surface of said filter cover and the substantial entirety of the other end surface of said filter element being in contact with said filter support member whereby all air drawn into the engine air intake normally passes through said filter element, the improvement comprising a plurality of spring-loaded cantilever type valves mounted to the interior surface of said filter cover and surrounded by the annulus of said filter element, each of said valves consisting of a valve member mounted to the free end of a cantilever spring valve arm of predetermined resiliency, each of said valve members being normally held by the resiliency of its associated cantilever spring valve arm in sealing relationship with a circular aperture through said filter cover, each of said valve members being of a generally disc-like configuration and defining a circular valve surface of a diameter substantially equal to but slightly less than the diameter of the circular apertures in said filter cover and a depending circumferential flange which mates with the interior wall of the aperture, whereby when the vacuum force in said engine air intake proximate said filter assembly overcomes the resilient spring force of said valve arms said valve members will be withdrawn from said apertures and unfiltered air drawn through said apertures into said air intake.

3. Air filter apparatus for the air intake of an internal combustion engine comprising, in combination: a filter support member sealably mountable to the air intake of an internal combustion engine; a cylindrical annular element supported by said filter support member with the substantial entirety of one end surface of said filter element in contact with said filter support member; a filter cover detachably mounted to said filter support member to secure said filter element to said support member by urging the inner surface of said filter cover against the substantial entirety of the other end surface of said filter element, said filter cover defining a plurality of apertures therethrough surrounded by the annulus of said filter element; and, a plurality of spring-loaded cantilever type valves, each of said valves consisting of a valve member mounted to the free end of a cantilever spring valve arm of predetermined resiliency, the cantilever spring valve arms of said valves being secured to the inner surface of said filter cover with one each of said valve members being normally held by the resiliency of its associated cantilever spring valve arm in sealing relationship with one of said apertures through said filter cover, the free ends of said cantilever spring valve arms being movable against the natural resiliency of the arm away from the inner surface of said filter cover.

References Cited in the file of this patent
UNITED STATES PATENTS

| | | |
|---|---|---|
| 1,195,983 | Farmer | Aug. 29, 1916 |
| 1,864,201 | Kegerreis et al. | June 21, 1932 |
| 2,083,649 | Heglar | June 15, 1937 |
| 2,766,845 | Raymond | Oct. 16, 1956 |